(12) United States Patent
Stewart et al.

(10) Patent No.: US 7,980,115 B2
(45) Date of Patent: *Jul. 19, 2011

(54) SELF-CALIBRATING LASER SEMICONDUCTOR ACCELEROMETER

(75) Inventors: Robert E. Stewart, Woodland Hills, CA (US); David B. Hall, La Crescenta, CA (US); A. Douglas Meyer, Woodland Hills, CA (US)

(73) Assignee: Northrop Grumman Guidance and Electronic Co, Inc., Los Angeles, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 12/156,274

(22) Filed: May 30, 2008

(65) Prior Publication Data
US 2009/0293583 A1 Dec. 3, 2009

(51) Int. Cl.
*G01P 21/00* (2006.01)
(52) U.S. Cl. ....................................................... 73/1.38
(58) Field of Classification Search .............. 73/514.21, 73/514.15, 514.26, 514.29, 514.32, 514.36, 73/514.38, 570, 649, 1.38
See application file for complete search history.

(56) References Cited

U.S. PATENT DOCUMENTS

| | | | | |
|---|---|---|---|---|
| 4,017,187 | A * | 4/1977 | Schwartz | 356/472 |
| 4,599,896 | A | 7/1986 | Stewart | 73/383 R |
| 6,591,027 | B2 | 7/2003 | Stewart | 385/16 |
| 7,481,110 | B2 | 1/2009 | Handrich et al. | 73/504.12 |
| 7,640,786 | B2 * | 1/2010 | Stewart | 73/1.38 |

FOREIGN PATENT DOCUMENTS
WO  WO 2005/066585 A1  7/2005
* cited by examiner

*Primary Examiner* — Hezron Williams
*Assistant Examiner* — Tamiko D Bellamy
(74) *Attorney, Agent, or Firm* — Lynn & Lynn

(57) ABSTRACT

A self-calibrating laser accelerometer system that continuously removes bias errors from acceleration measurements under dynamic operating conditions has a frame with a pair of essentially identical mass modulated accelerometers positioned within the frame. Each accelerometer includes a proof mass mounted to the sensing element frame by a flexure suspension. The proof mass is arranged to rotate about an output axis in response to acceleration of the sensing element frame along an input axis. The first proof mass includes a secondary mass that is movable between a first stable position on a first side of the output axis and a second stable position on a second side of the output axis to provide mass modulation of the first proof mass and to provide a selectively reversible polarity to the input axis and to provide self-calibration of bias.

7 Claims, 12 Drawing Sheets

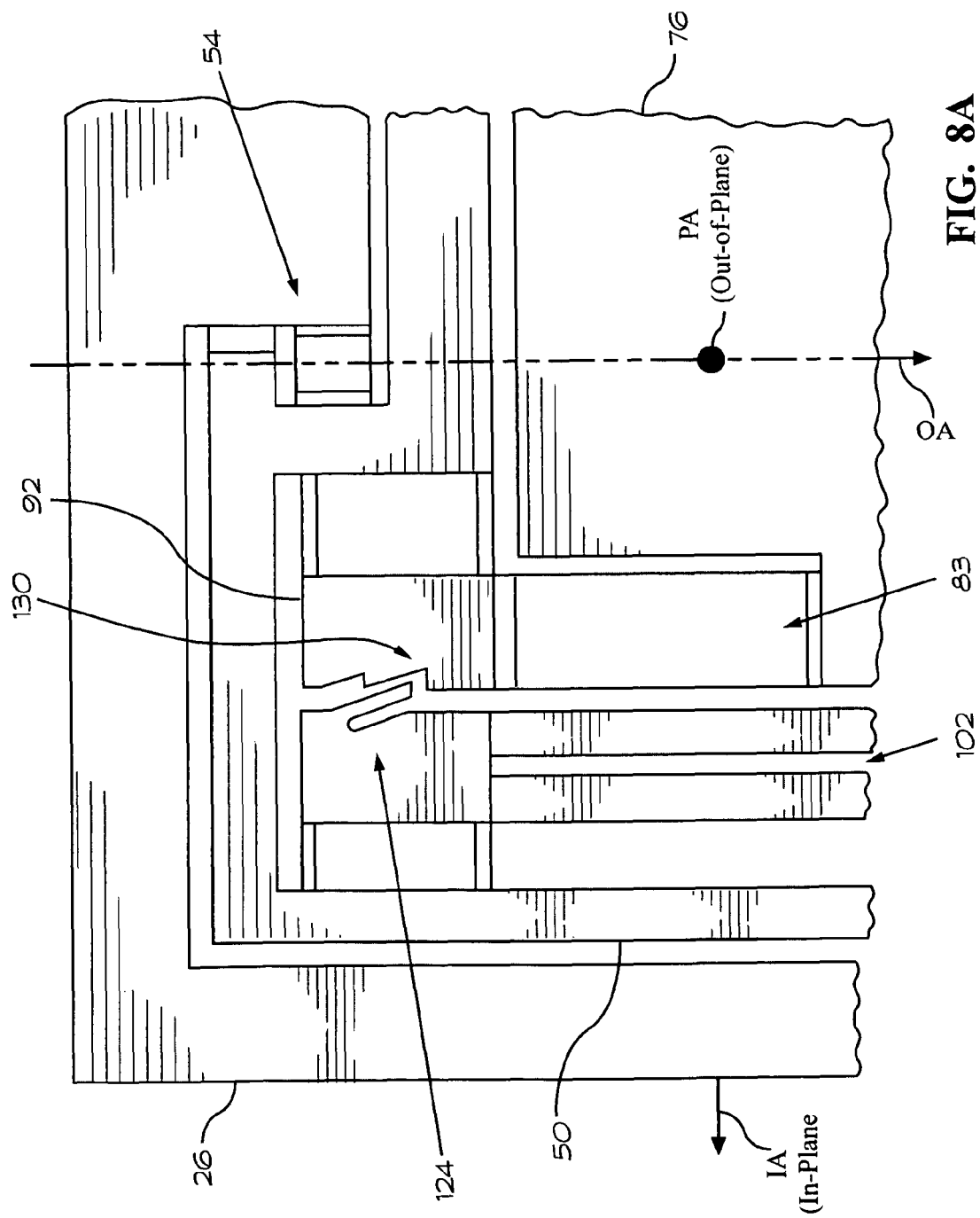

SELF-CALIBRATING LASER SEMICONDUCTOR ACCELEROMETER

BACKGROUND OF THE INVENTION

This invention relates generally to navigation equipment and particularly to accelerometers. Still more particularly, this invention relates to a

BACKGROUND OF THE INVENTION

Pendulous Integrating Gyro Accelerometers (PIGAs) and Specific Force Integrating Receivers (SFIRs) are very high accuracy accelerometers primarily used in strategic missile guidance systems. A pendulous accelerometer is based on the principle that an acceleration that displaces a suspended mass can be determined from the angle of displacement. These accelerometers have bias and scale factor performance that are one to two orders of magnitude more accurate than conventional navigation-grade accelerometers such as Northrop Grumman's A4 and SiAc accelerometers. PIGAs and SFIRs, on the other hand, are two orders of magnitude more expensive and have lower reliability, and therefore have high life cycle cost. Alternate, lower cost accelerometers such as vibrating beam accelerometers (VBAs) with improved reliability have been under development as replacements for PIGAs and SFIRs for more than two decades. While a considerable investment continues to be made in these alternate strategic-grade accelerometer technologies, none have achieved the technical readiness level to be deployed.

A variety of Helium-Neon laser accelerometers, based on laser gyroscope technology, in which the internal cavity length, and therefore the frequency of the laser, is a function of acceleration have also been proposed in the past as replacements for PIGAs and SFIRs. In general, cavity length based laser accelerometers measure the full acceleration range with proof mass displacements of less than one wavelength to avoid mode hopping. For a 633 nm laser wavelength the full range displacement of the cavity length is less than 0.32 µm. This displacement corresponds to a full range acceleration of 20 times the acceleration of gravity. The dynamic range of the accelerometer is required to be greater that 107. For the accelerometer to have bias stability and repeatability of less than 2 µg the cavity length must be stable and repeatable over temperature to less than $3 \times 10^{-14}$ meters or 0.00003 Å. If the laser body is fabricated from a material such as Zerodur, which has a coefficient of thermal expansion between 0.02 and 0.1 ppm/° C. and the cavity lengths are 10 cm; then the thermal gradient between the two cavities, used to provide common mode rejection of ambient temperature change, would need to be less than $1.5 \times 10^{-5}$ to $3 \times 10^{-6 \circ}$ C. This extreme sensitivity of the accelerometer bias to thermal gradients is one of the principal reasons for prior laser accelerometers not meeting the bias stability and repeatability required for strategic applications.

SUMMARY OF THE INVENTION

A self-calibrating semiconductor laser accelerometer according to the present invention overcomes the bias limitations of the prior art by continuously measuring and removing all sources of bias error from the measured acceleration under dynamic operating conditions.

A self-calibrating laser accelerometer system that continuously removes bias errors from acceleration measurements under dynamic operating conditions comprises a frame with a pair of essentially identical mass modulated accelerometers positioned within the frame. Each accelerometer includes a proof mass mounted to the sensing element frame by a flexure suspension. The proof mass is arranged to rotate about an output axis in response to acceleration of the sensing element frame along an input axis. The first proof mass includes a secondary mass that is movable between a first stable position on a first side of the output axis and a second stable position on a second side of the output axis to provide mass modulation of the first proof mass and to provide a selectively reversible polarity to the input axis and to provide self-calibration of bias.

Each accelerometer may further include a variable cavity length laser having a cavity length determined by the angular position of the proof mass within the sensing element frame. The accelerometer further includes a laser having a fixed cavity length. The optical output from each variable cavity length laser is combined with the optical output from the fixed cavity length laser to form two interference patterns. These interference patterns convert the optical frequency difference for both laser combinations into two electrical accelerometer output signals. The use of the fixed cavity length laser to form interference patterns with the two variable cavity length lasers provides first order common mode rejection of non-acceleration induced cavity length changes due to mechanical deformation and ambient temperature changes.

The mass modulated accelerometers preferably are formed in a silicon-on-insulator wafer having a handle layer, a silicon dioxide layer and a device layer with the first and second proof masses and the first and second flexure suspensions being formed in the handle layer. Each secondary mass is supported in its corresponding proof mass by a buckled beam flexure system. A pair of thermal actuator beams is arranged to hold each buckled beam flexure system in compression such that the secondary mass is in its first stable position with the thermal actuator beams being arranged to selectively remove the compression from the buckled beam suspensions causing the secondary mass to translate to its second stable position and reverse the polarity torque on the first proof mass in response to acceleration while non-acceleration induced torques do not reverse.

The self-calibrating accelerometer system may further include a first pair of mass modulated accelerometers as described above formed in the wafer and arranged to measure acceleration along a first sensing axis in the plane of the wafer, a second pair of mass modulated accelerometers as described above formed in the wafer and arranged to measure acceleration along a second sensing axis in the plane of the wafer and perpendicular to the first sensing axis, and a third pair of mass modulated accelerometers as described above formed in the wafer and arranged to measure acceleration along a third sensing axis perpendicular to the plane of the wafer.

The self-calibrating accelerometer system may include a capacitive signal pickoff system.

The following detailed description of the invention explains the operating principles and structure of a high accuracy, high reliability, self-calibrating semiconductor laser accelerometer that has the potential to replace PIGAs and SFIRs in strategic missile guidance systems as well as provide low cost, low power accelerometers with improved performance for traditional navigation-grade inertial guidance systems.

BRIEF DESCRIPTION OF THE DRAWINGS

FIG. 8A illustrates a preload latching mechanism and a buckled beam suspension for that may be included in an embodiment of the present invention having an in-plane input axis;

DETAILED DESCRIPTION OF THE INVENTION

Figure 1A:
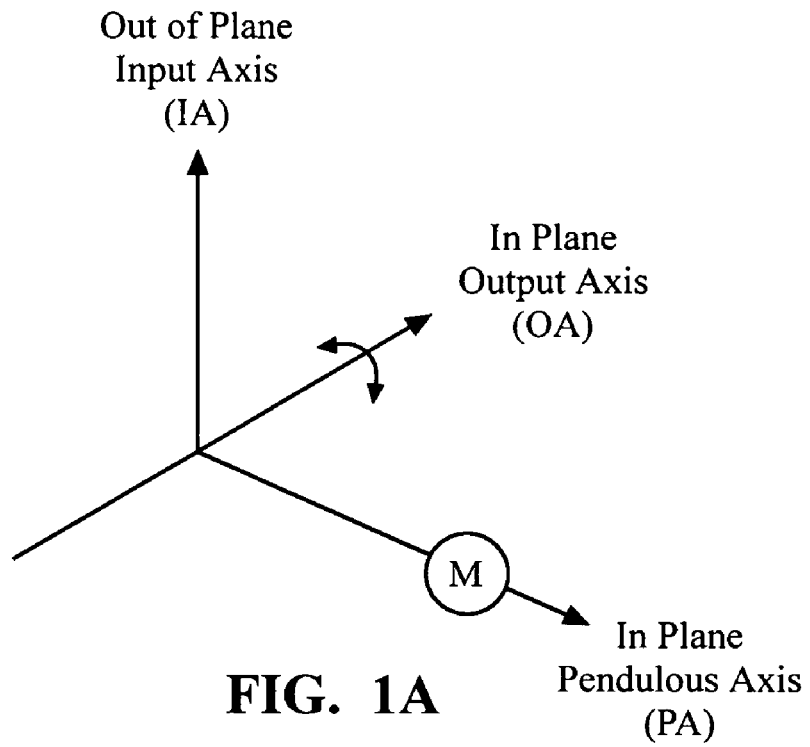
FIG. 1A graphically illustrates accelerometer axes where the pendulous axis is out-of-plane and the input axis and the output axis are in-plane.
Figure 1B:
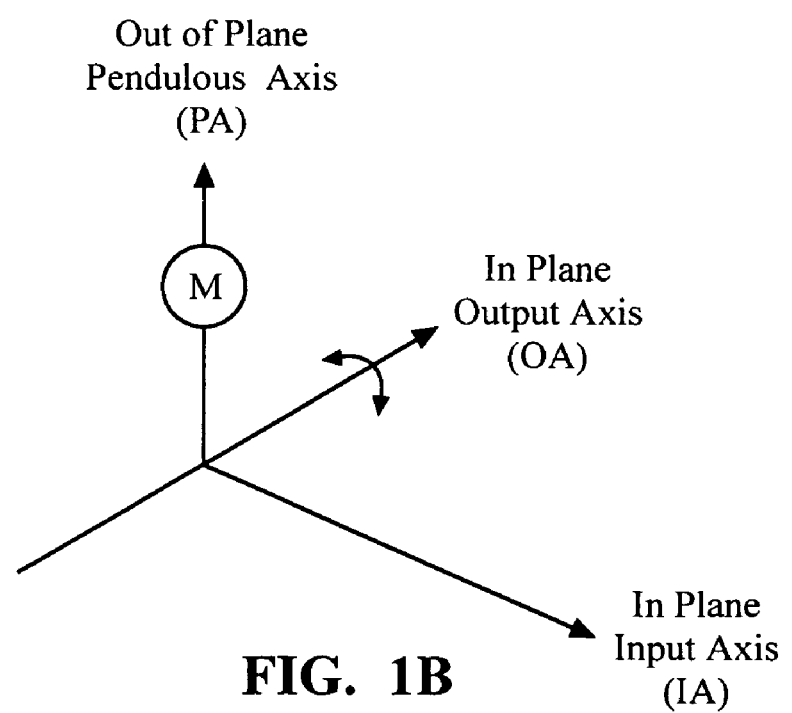
FIG. 1B graphically illustrates accelerometer axes where the input axis is out-of-plane and the pendulous axis and the output axis are in-plane.

The structural features and advantages of the present invention may be better understood and appreciated after terms commonly used in inertial measurement technology are explained. Linear acceleration along an input axis (IA) is measured by angular displacement of a proofmass M about an output axis (OA) that is perpendicular to the input axis. The pendulous axis is a line through the center of mass of the proof mass, perpendicular to and intersecting the output axis. The positive direction is defined from the output axis to the proof mass. FIG. 1A illustrates an in-plane pendulous, an in-plane output axes and an out-of-plane input axis. Referring to FIG. 1B, the pendulous axis PA is out-of-plane and the input and output axes are perpendicular and are in-plane.

Figure 1C:
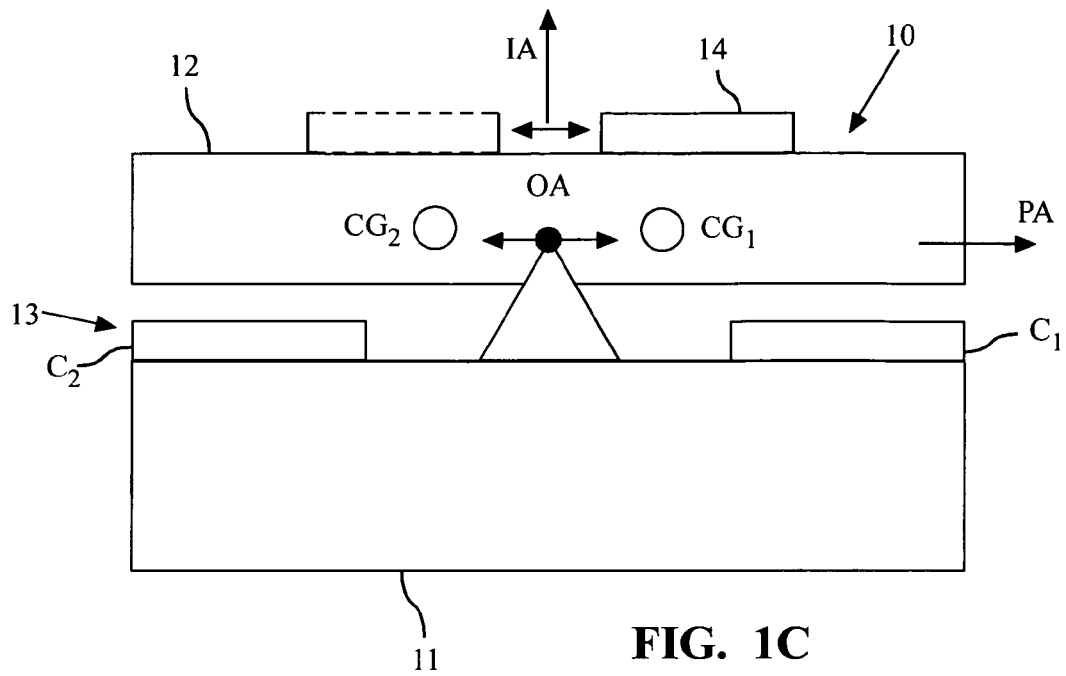
FIG. 1C schematically illustrates a self calibrating laser accelerometer having its input axis (IA) normal to the plane of the sensing element.

FIG. 1C is a schematic diagram of an accelerometer 10 having a frame 11 and a sensing element 12. The sensitive or input axis IA normal to the plane of the sensing element 12. The sensing element 12 may be formed as a plate supported by flexures (not shown in FIG. 1C) that allow rotation about a transverse centerline, which is the output axis. The apex of the triangle in FIG. 1C depicts this centerline as a fulcrum. The center of mass (CG) of the sensing element 12 has two stable positions $CG_1$ and $CG_2$ that are on opposite sides of the axis of rotation defined by the centerline of suspension. A secondary mass 14 in the proofmass translates in-plane with the plate 12 to move the center of mass right and left between the two stable positions. The ability to change the location of the center of mass is called mass modulation. The principle of mass modulation is described in U.S. Pat. No. 4,599,896, the disclosure of which is incorporated by reference into this description of the present invention. Relocating the center of mass from one side of the centerline of suspension to the other side reverses the polarity of the input axis and enables self-calibration of accelerometer bias. Under acceleration along the input axis the sensing element rotates clockwise about the centerline with the center of mass in the $CG_1$ position and counterclockwise with the center of mass in the $CG_2$ position. This rotation of the sensing element 12 causes changes in the capacitance of capacitors $C_1$ and $C_2$ that may be detected and used to form a signal pickoff for the accelerometer 10. The preferred way to determine the acceleration is to electrostatically force rebalance sensing element 12 using a pulse width modulated, charge control servo described in U.S. Pat. No. 5,142,921, the disclosure of which is incorporated by reference into this description of the present invention. The electrical signal required to rebalance the sensing element therefore indicates the acceleration.

Figure 1D:
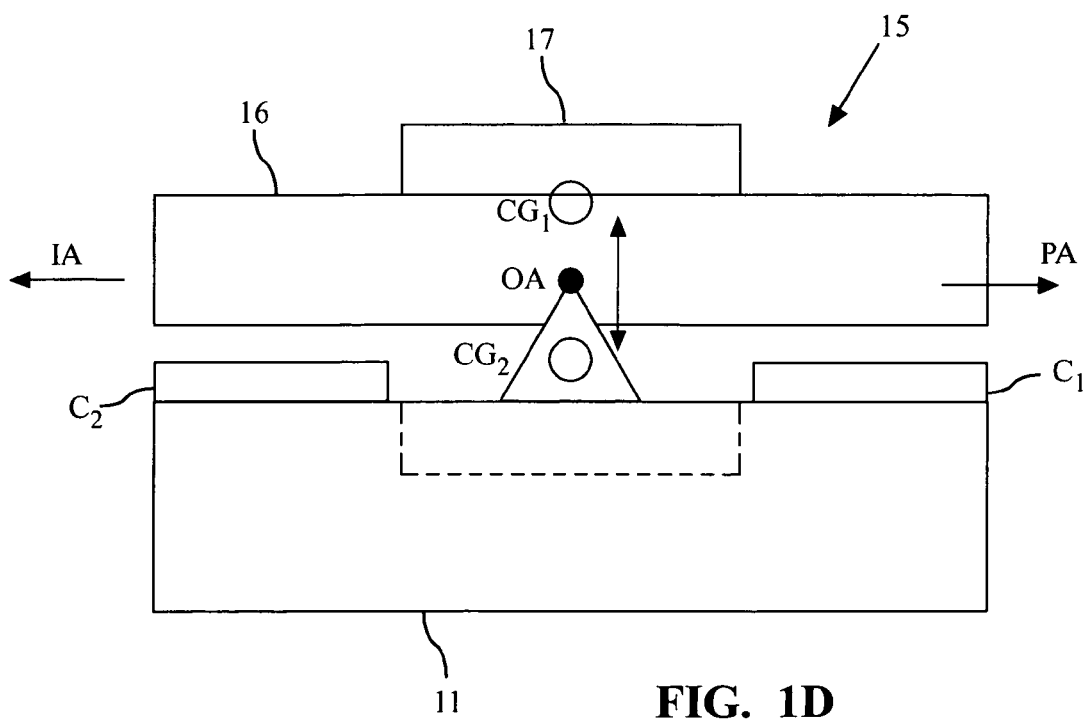
FIG. 1D schematically illustrates a self calibrating laser accelerometer having its input axis (IA) in the plane of the sensing element.

FIG. 1D is a schematic diagram of an accelerometer 15 with its input axis IA being in-plane with a sensing element 16. To change the polarity of the accelerometer 15 the center of mass is moved vertically between two bistable positions above and below the centerline of suspension. Moving the center of mass is accomplished by translating a secondary mass 17 up and down out-of-plane. The sensing element 16 preferably is electrostatically force rebalances in the same manner as described above with reference to FIG. 1C.

Self-calibration to remove accelerometer bias as an error source involves successive simultaneous measurements of acceleration by two accelerometers with sequentially alternating polarities. Signals that indicate acceleration measurements by the two accelerometers are combined to null the bias of each accelerometer and produce a signal that indicates only the acceleration along the selected sensing axis.

Figure 2A:
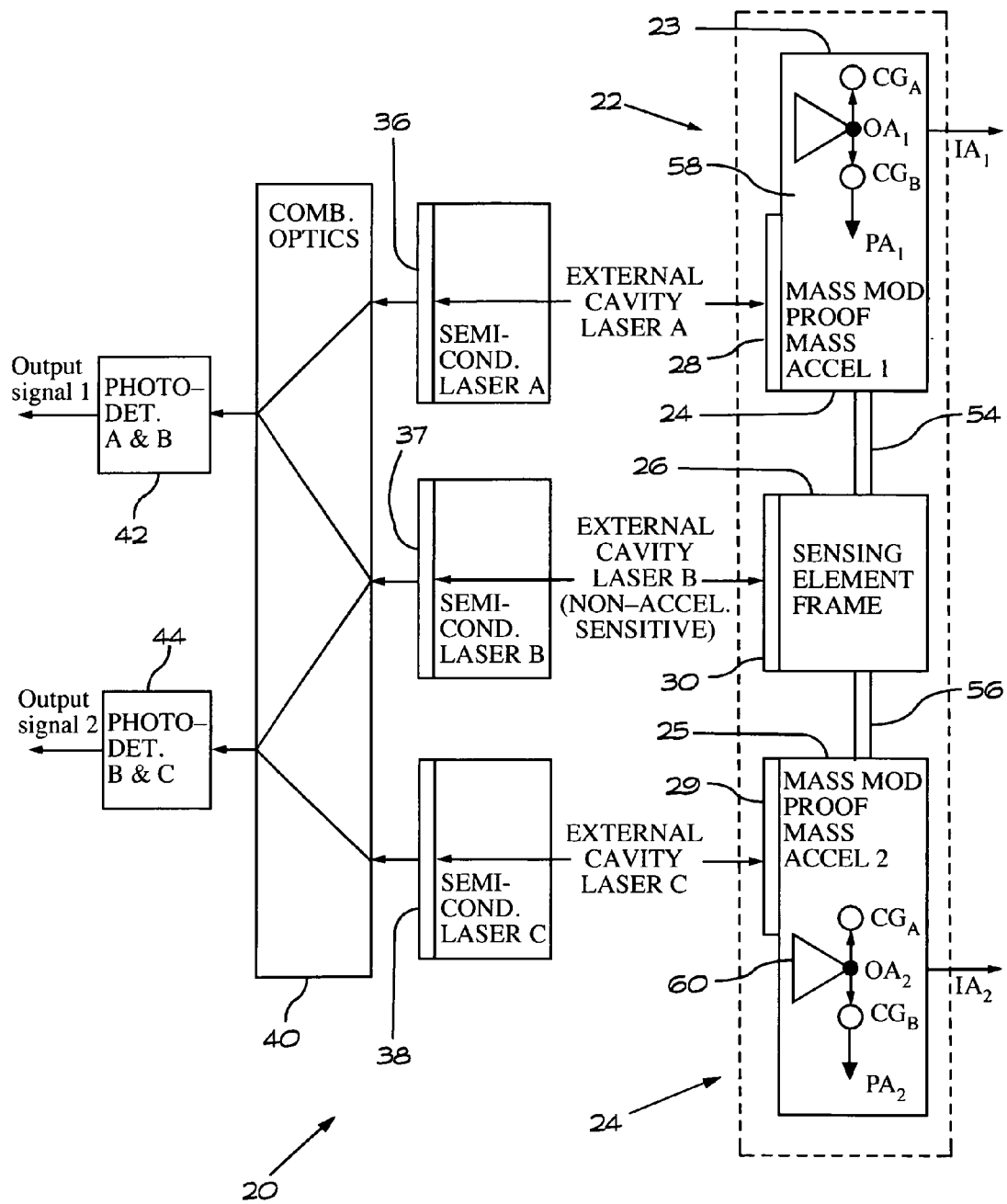
FIG. 2A is a block diagram of a self-calibrating semiconductor laser accelerometer according to the present invention having an out-of-plane input axis.

FIG. 2A is a schematic diagram of a self-calibrating semiconductor laser accelerometer system 20 according to the present invention having an out-of-plane input axis. The self-calibrating semiconductor laser accelerometer system 20 includes a first sensing element 22 that is comprised of a first mass modulated proof mass accelerometer 23 and a second sensing element 24 that is comprised of a second mass modulated proof mass accelerometer 25. The first and second mass modulated proof mass accelerometers 23 and 25 are mounted to a sensing element frame 26. The first and second mass modulated proof mass accelerometers include mirrors 28 and 29, respectively. The sensing element frame 26 includes a mirror 30.

The mirrors 28-30 are arranged to face a corresponding plurality of semiconductor lasers A-C, respectively. The semiconductor lasers A-C include partially reflective surfaces 36-38, respectively. The mirrors 28-30 are spaced apart from the partially reflective surfaces 36-38, respectively, to define external cavities A-C for the semiconductor lasers A-C, respectively. The semiconductor lasers A-C provide output laser beams A-C to a combining optics device 40 through the partially reflective surfaces 36-38. The combining optics device 40 combines the signals output from semiconductor lasers A and B and directs the combined output to a photodetector 42. The combining optics device 40 combines the signals output from semiconductor lasers B and C and directs the combined output to a photodetector 44.

Figure 4:
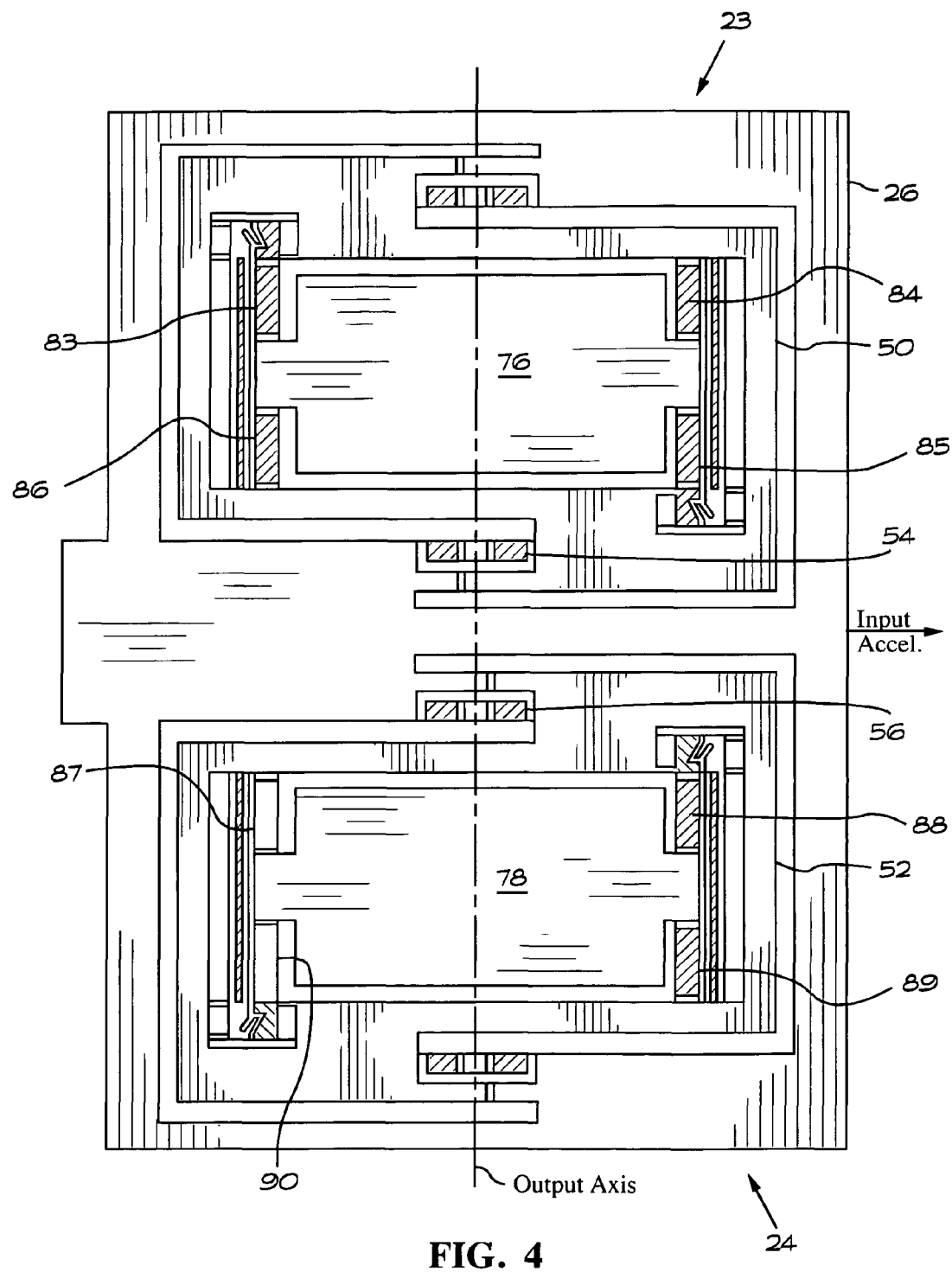
FIG. 4 is a plan view showing sensing elements that may be included in the invention as shown in FIG. 3.

As shown in FIG. 4, the mass modulated proof mass accelerometer 24 includes a pair of proofmasses 50 and 52, preferably formed as rectangular plates, supported by a corresponding pair of flexures 54 and 56 to the sensing element frame 26. The flexures 52 and 54 allow the proofmasses 50 and 52 to rotate about their suspension axes or output axis. In FIG. 2A triangles 58 and 60 depict these output axes as fulcrums. The centers of gravity (CG) of the sensing elements 22 and 24 are shown as having two stable positions, $CG_A$ and $CG_B$, one on each side of the output axis. Relocating the centers of gravity from one side of the output axis to the other reverses the polarity of the input axis (IA in FIG. 2A) and enables the self-calibration of accelerometer bias. The external cavity semiconductor lasers A and C, shown at the top and bottom of FIG. 2A, sense the angular deflection of sensing elements 1 and 2 as changes in their cavity lengths. The frequency of each laser varies with the change in length of its corresponding external cavity, increasing frequency with decreasing cavity length. The individual outputs of lasers A and C are combined in the combining optics 40 with the output of the non-acceleration-sensitive laser B to form interference patterns that are directed to photodetectors 42 and 44. These interference patterns convert the optical frequency difference for both laser combinations A-B and B-C into electrical accelerometer output signals 1 and 2. The use of laser B to form interference patterns with lasers A and C provides first order common mode rejection of non-acceleration induced cavity length changes due to mechanical deformation and ambient temperature changes.

Figure 2B:
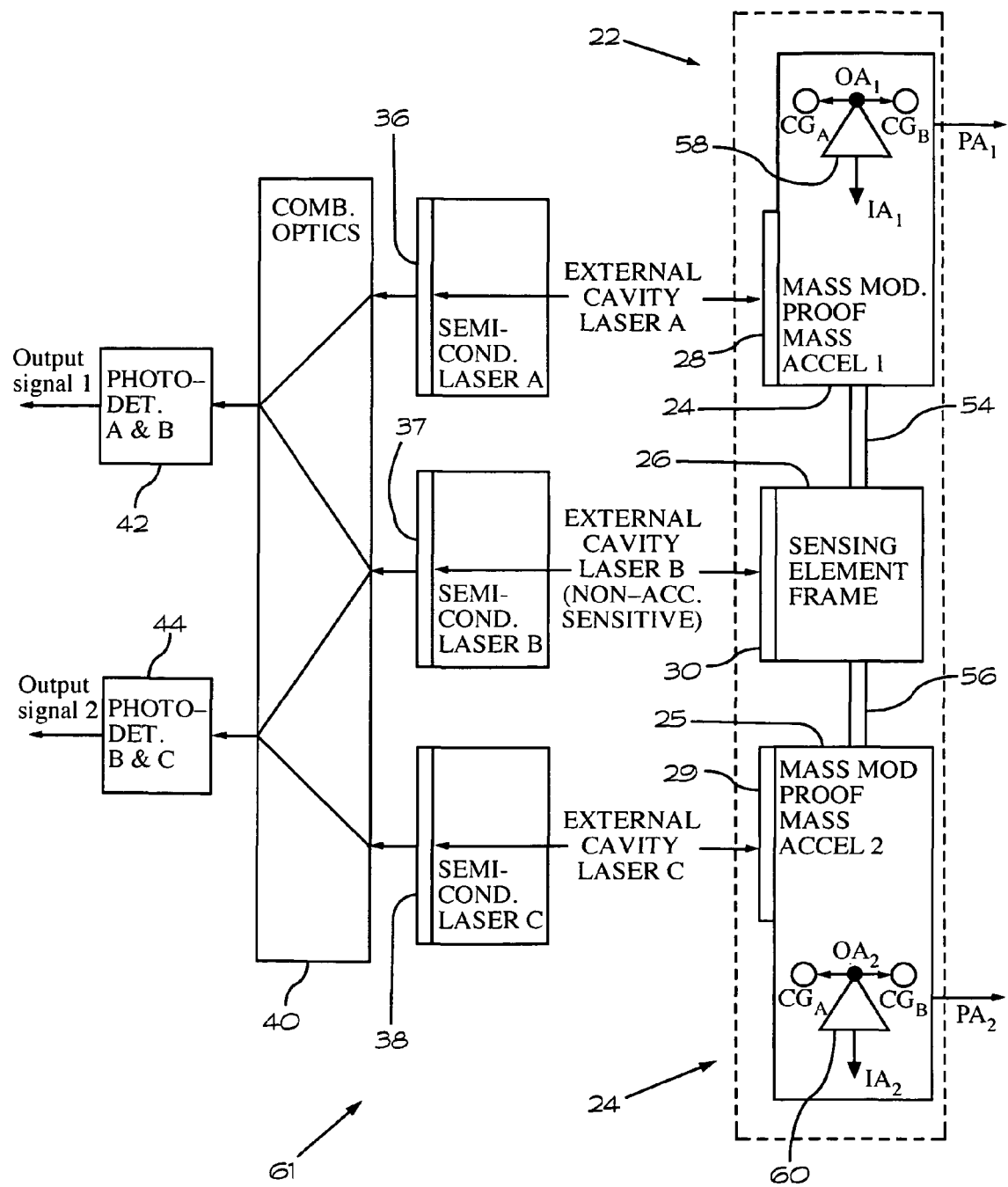
FIG. 2B is a block diagram of a self-calibrating semiconductor laser accelerometer according to the present invention having an in-plane input axis.

FIG. 2B shows a self-calibrating semiconductor accelerometer system 61 that is similar to FIG. 2A with differences being that the input axes $IA_1$ and $IA_2$ are in-plane with respect to their corresponding sensing elements. By combining two in-plane accelerometers 20 arranged to measure acceleration along perpendicular axes with the accelerometer 61 to measure acceleration on an out-of-plane axis, a three-axis accelerometer system may be formed.

The change in the laser frequency ($\Delta f$) for a change in cavity length ($\Delta L$) is given by the equation:

$$\Delta f = \frac{c\Delta L}{2\lambda L}. \qquad (1)$$

Now for $$\Delta L = \frac{\lambda}{2}$$

the frequency change is $$\Delta f = \frac{c}{4L}, \qquad (2)$$

where:
c=velocity of light,
$\lambda$=wavelength of the light wave,
$\Delta L$=change in cavity length=$\lambda/2$, and
L=cavity length.

A laser with cavity length L=$7.5\times10^{-3}$ m will have $\Delta f=1\times10^{10}$ Hz. The scale factor for an accelerometer with a range of ±70 g (with g being the acceleration of gravity) is 1.0 GHz/g.

The stability and repeatability of the accelerometer bias is desired to be in the range of 0.1 to 1.0 μg. This requirement is met by using a flexure material with highly stable and repeatable elastic properties such as single crystal silicon or fused silica and a highly stable, repeatable and linear laser pickoff. Maintaining a constant operating temperature may also be used to improve scale factor stability and repeatability.

Historically, bias stability and repeatability have been the most difficult requirements to meet. The self-calibrating semiconductor laser accelerometer system according to the present invention is designed to meet the bias performance by continuous dynamic measurement and elimination of bias from the measured acceleration. Bias self-calibration under dynamic conditions requires the simultaneous measurement of acceleration by the two accelerometers 23 and 25 with sequentially alternating polarities. The outputs of the accelerometers 23 and 25 may be processed in a digital signal processor (not shown) to determine the actual acceleration. The polarity reversal is accomplished by alternating the location of the centers of gravity of the proof masses 50 and 52 between opposite sides of the output axis as noted earlier.

Figure 3:
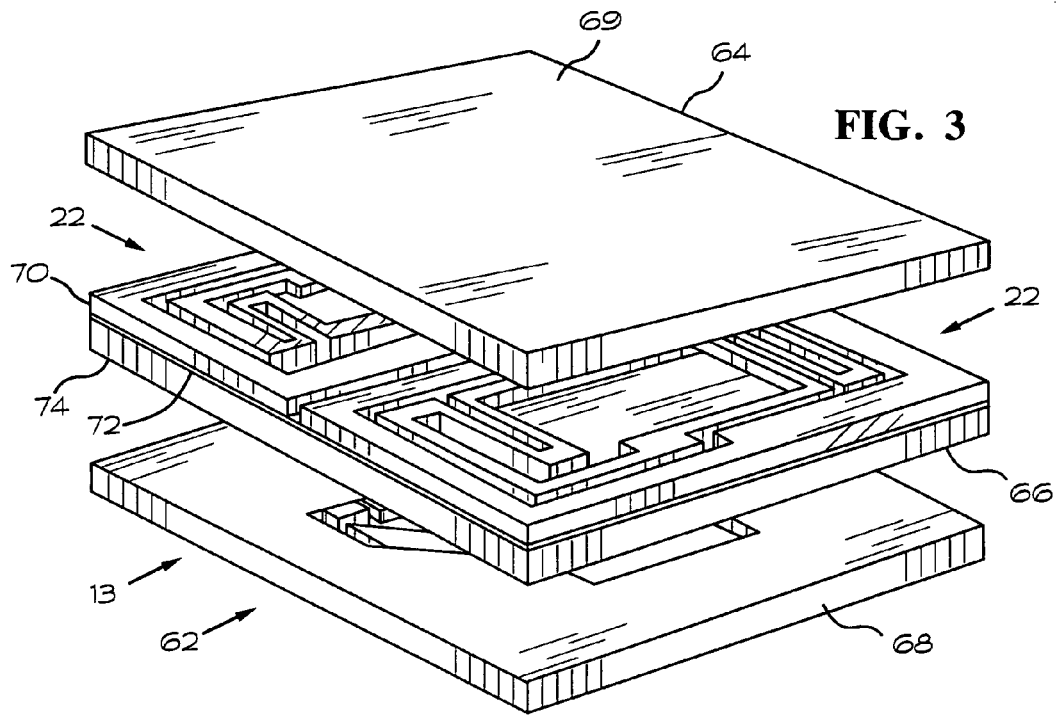
FIG. 3 is an exploded perspective view showing an embodiment of the invention formed in a multilayer silicon die.

The self-calibrating semiconductor laser accelerometer sensor system 20 is preferably formed as a silicon die 62 that includes three layers as shown in the exploded perspective view of FIG. 3. The top layer is the cover 64. The center layer is a sensing element layer 66 that includes the sensing elements 22 and 24. The bottom layer includes the optical pickoff 13. The outputs of the self-calibrating semiconductor laser accelerometer sensor system 20 are two simultaneous measurements of acceleration with sequentially alternating scale factor polarities. The two acceleration measurements preferably are processed in a Kalman filter that continuously measures and removes the bias from each of the measured accelerations. The two self-compensated acceleration measurements are averaged to reduce random walk by the square root of two.

The cover 64 of the self-calibrating semiconductor laser accelerometer sensor system 20, shown in FIG. 3, preferably is a rectangular silicon plate 69 that is joined to the sensing element by direct wafer fusion bonding or other suitable method to form a hermetic seal. The cover 64 also acts as a heat sink for the thermal actuators (not shown in FIG. 3) that are used in mass modulating the proofmasses 52 and 54. The thermal actuators are rapidly heated by a current pulse and need to be rapidly cooled by thermal conduction and radiation.

FIG. 4 is a plan view of the sensing element layer 66. The sensing element layer 66 preferably is fabricated from a silicon-on-insulator (SOI) wafer. As shown in FIG. 3, SOI wafers have three layers, a handle layer 70, a silicon dioxide layer 72 and a device layer 74. In the present invention the handle layer 70 is patterned and etched to form the two proof masses 50 and 52 supported by flexures 54 and 56, respectively, to the frame 26. Secondary masses 76 and 78 are located in respective cavities 77 and 79 in the proof masses 50 and 52, respectively. The secondary masses 76 and 78 are formed in the device layer 74. Each of the secondary masses 76 and 78 is movable between two bistable positions as previously described. The secondary masses 76 and 78 are supported by corresponding buckled beams 83-86 and 87-90, respectively.

Figure 5A:
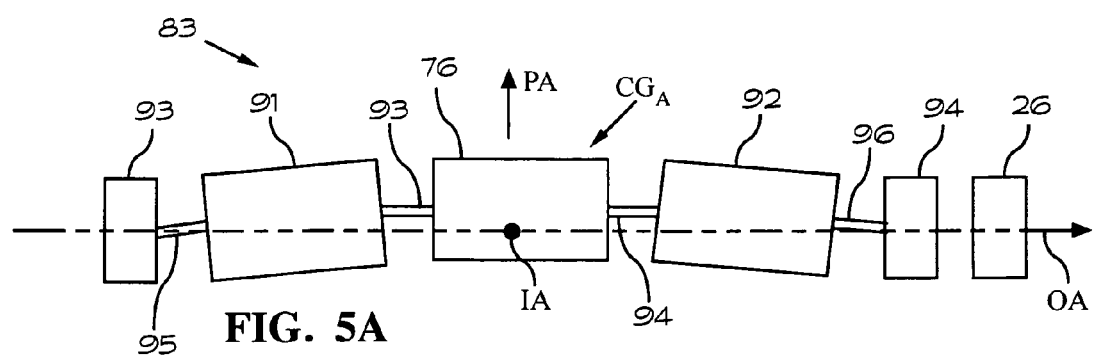
FIG. 5A is an elevation view showing a buckled beam suspension system holding a secondary mass in a first bistable state.
Figure 5B:
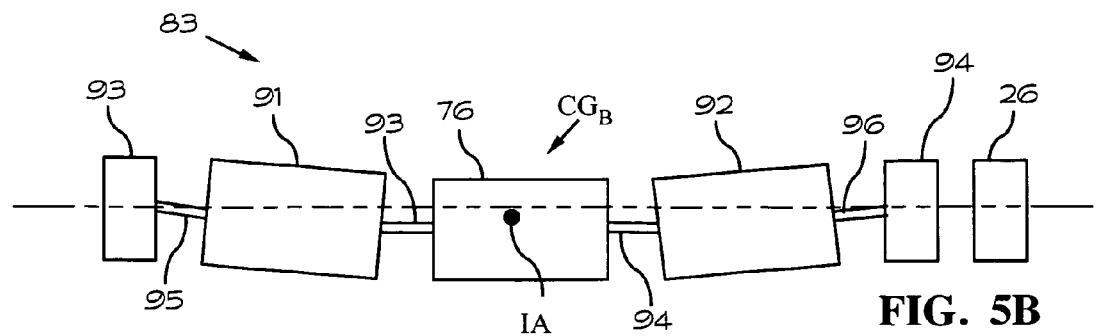
FIG. 5B is an elevation view showing the buckled beam suspension system holding the secondary mass in a second bistable state.

The buckled beams 83-90 are all preferably identical so that only the structure of the buckled beam 83 is presented herein. FIGS. 5A and 5B show the buckled beam 83 arranged for an out-of-plane input axis and in-plane output and pendulous axes. Referring to FIGS. 5A and 5B, the buckled beam 83 may include a plurality of suspension elements 91 and 92 and compliant end blocks 93 and 94. The suspension elements 91 and 92 are connected to the secondary mass 76 by flexible members 93 and 94, respectively. A flexible member 95 connects the compliant end block 93 to the suspension element 91, and a flexible member 96 connects the compliant end block 94 to the suspension element 92. As illustrated in FIGS. 5A and 5B, the buckled beam suspension system 83 is configured to cause the secondary mass 76 to move in-plane between two bistable positions $CG_A$ and $CG_B$.

Figure 6A:
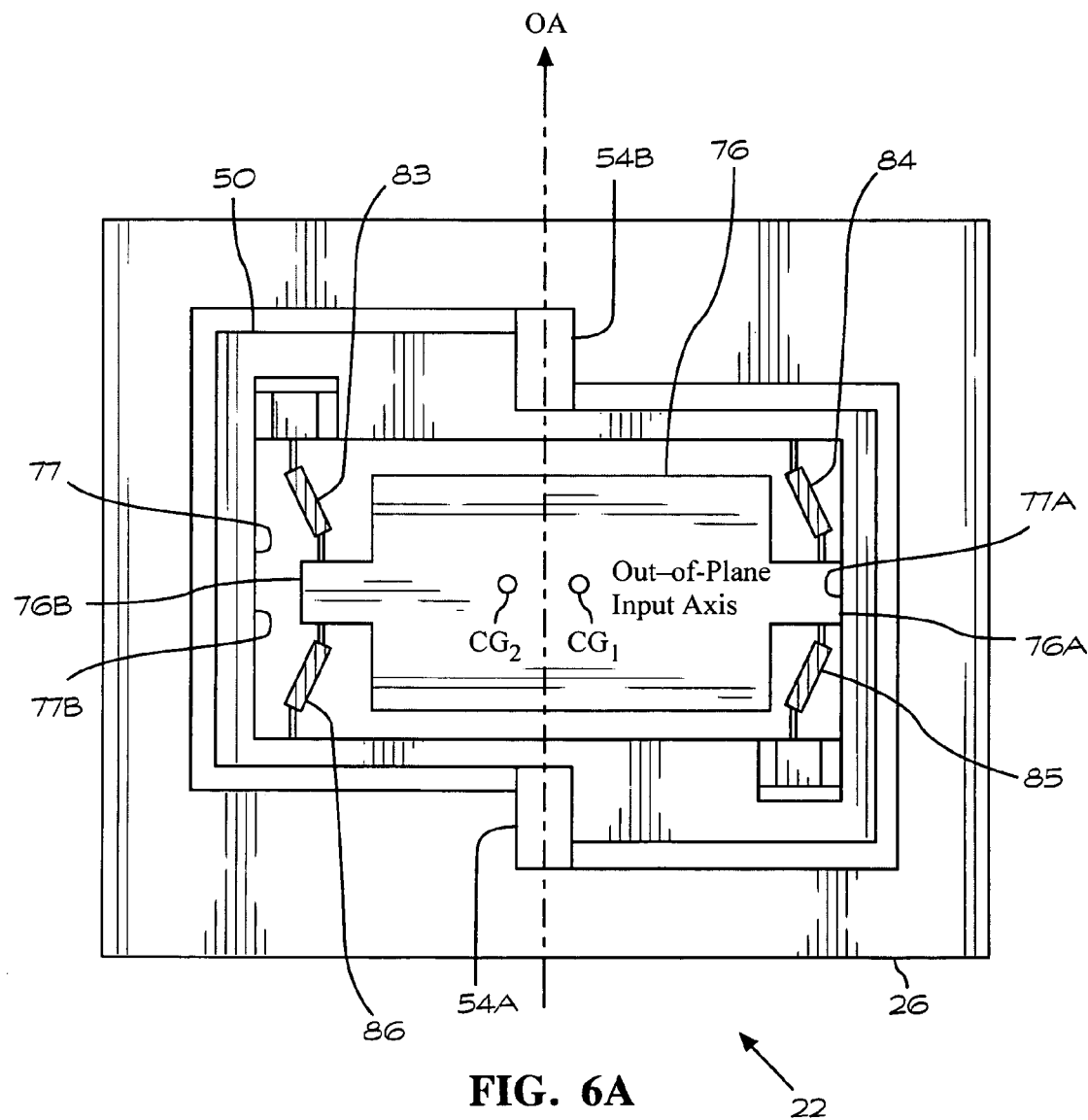
FIG. 6A is a plan view showing a buckled beam suspension system connecting a secondary mass to a proof mass for an accelerometer according to the present invention having an out-of-plane input axis.

FIG. 6A is a plan view showing the sensing element 22 arranged to produce a signal in response to acceleration normal to the plane of the sensing element 22. The secondary mass 76 is suspended inside the proofmass 50 by in-plane buckled beams 83-86. The proofmass 50 is connected to the frame 26 by the flexure suspension 54, which includes flexure components 54A and 54B. The secondary mass 76 is shown in one of the bistable positions $CG_1$ with the buckled beams 83-86 in compression. When the secondary mass 76 is in the $CG_1$ position, a first end 76A of the proofmass 76 is adjacent an inner wall portion 77A of the cavity 77. Thermal actuators (not shown in FIG. 6A) momentarily reduce the compression force below the critical buckling force and cause the secondary mass 78 to move to the other bistable position. As the secondary mass moves to the left in FIG. 6A after removal of the compression force, its inertia carries it beyond the neutral position to the second bistable position $CG_2$ where an end 76B of the proofmass 76 contacts an inner wall portion 77B of the cavity 77. Turning off the thermal actuators reestablishes the compression force, which then holds the secondary mass in the other bistable position until electrical current is again applied to the thermal actuators.

The bistable positions $CG_1$ and $CG_2$ are on opposite sides of the output axis OA, which is defined by a line through the centers of the flexure components 54A and 54B. Acceleration normal to the plane of the sensing element causes the sensing element 22 to rotate about the output axis OA, which is in-plane. The direction of rotation about the line OA depends upon whether the proofmass 76 is in its $CG_1$ position or its $CG_2$ position.

Figure 6B:
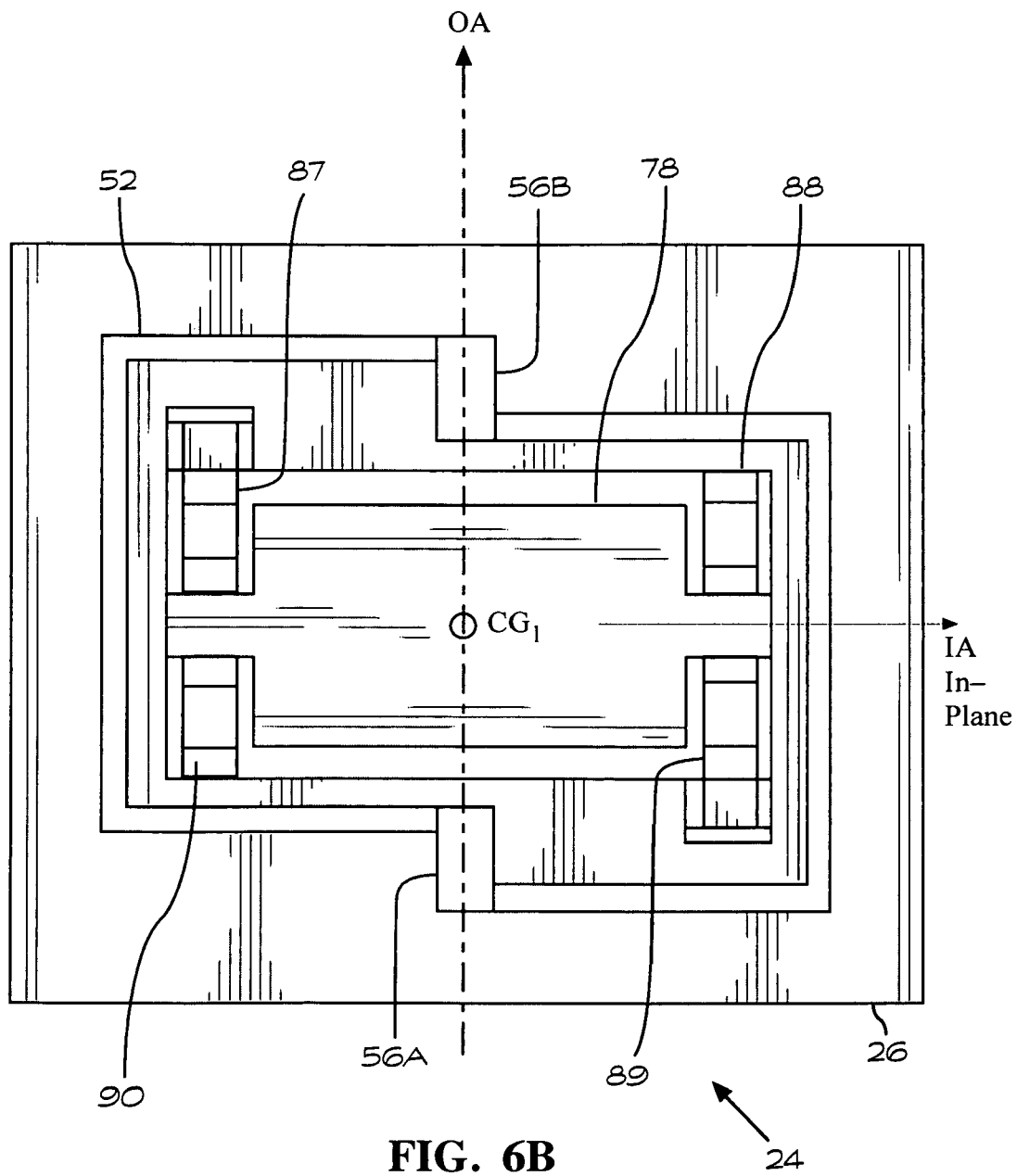
FIG. 6B is a plan view showing a buckled beam suspension system connecting a secondary mass to a proof mass for an accelerometer according to the present invention having an in-plane input axis.

FIG. 6B shows the sensing element 24 arranged to be sensitive to acceleration in the plane of the sensing element 24. The components contained in the sensing element 24 are similar to those of the sensing element 22 of FIG. 6A. The difference is in the orientation of the buckled beams 87-90 relative to the plane of the sensing element 24. FIG. 6B has the buckled beams 87-90 arranged so that the secondary mass moves 78 out-of-plane relative to the frame 26 between bistable positions above and below a neutral in-plane position. The center of mass thus is either above or below the center of support. The input axis is therefore in the plane of the sensing element and normal to the place containing the centerline of suspension and the center of mass. Two sensing elements having in-plane sensing axes and one sensing element having an out-of-plane sensing axis as described above may be arranged to form a three-axis orthogonal set.

Figure 7:
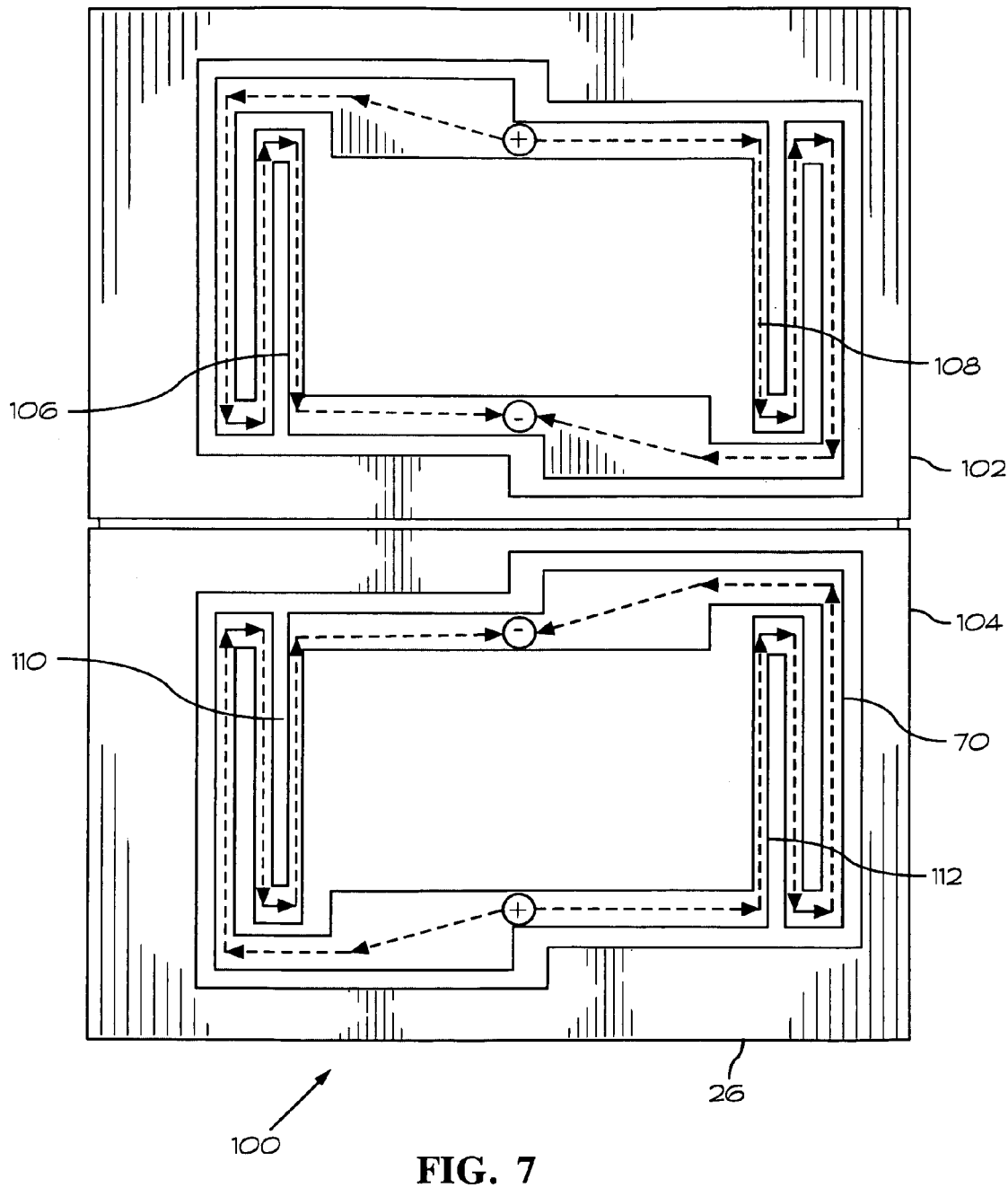
FIG. 7 is a plan view of a thermal actuator that may be included in the present invention.

Referring to FIGS. 7 and 8A, an electrical current pulse resistively heats a dual thermal actuator 100 that is adjacent to the buckled beams 83-90. The dual thermal actuator 100 may be formed as thin film heating device in a manner well known in the art. The momentary thermal expansion of the actuator beams 102-105 reduces the compressive force on the buckled beams 87-90 causing the secondary masses 76 and 78 to translate to the other bistable position. See U.S. Pat. No. 6,591,027 entitled Bi-stable Micro Actuator and Optical Switch for a detailed description of a suitable thermal actuation method. The disclosure of U.S. Pat. No. 6,591,027 is incorporated by reference into this description of the present invention. The input axis (IA) is in the plane of the sensing element; and as the centers of gravity translate between the two bistable positions, the polarity of the torque on each of the proof masses 50 and 52 in response to acceleration is reversed while non-acceleration induced torques (bias) do not reverse.

FIG. 7 is a plan view of the dual thermal actuator 100 that may be included in the invention. The thermal actuator 100 is fabricated from the device layer 74 of the sensing element SOI wafer. The dual thermal actuator 100 includes four regions. Two outer regions 102 and 104 are attached to the sensing element frame 26 in the handle layer 70 through the buried oxide layer of the SOI wafer. Two inner regions 106 and 108 are attached to the proofmass 76, and two inner regions 110 and 112 are attached to the proofmass 78 in handle layer 70 of the sensing element 22 through the buried oxide layer of the SOI wafer. Electrical current pulses are applied alternately to the inner regions 106, 108, 110 and 112 through the flexure suspensions 54 and 56. The dashed lines with arrows in FIG. 7 indicate the electrical current paths in the thermal actuator 100. The dual thermal actuator 100 may alternate the polarities of the sensing elements 22 and 24 at about 10 Hz to 50 Hz. The current pulses are electrically isolated from the sensing element frame 26 by the oxide layer. Electrical contact between the flexures 54 and 56 and the inner regions 106, 108, 110 and 112 of the thermal actuator 100 is made through metallized vias in a manner well-known in the art. The resistivity and thickness of the device layer 74 and the gap to the cover 64 are chosen to optimize the thermal actuation for minimum voltage and reliable operation.

FIG. 8A is an expanded view of a portion of the apparatus of FIG. 4. FIG. 8A illustrates one of four preload latching mechanisms 124-127 that facilitate the preloading the buckled beam suspensions 83-90. FIG. 8A represents the situation where the buckled beam suspensions 83-90 are arranged for sensing acceleration along an in-plane input axis. The preloading is accomplished by applying a force to deflect the secondary mass 76 normal to the plane of the sensing element 22. The compliant end block 92 of the buckled beam suspension is thereby pulled back until a notch 130 in the end-block 92 engages the latch in the thermal actuator beam end-block (not shown). When the force deflecting the secondary mass 80 is removed, the thermal actuator beams are placed in compression; and the buckling force is maintained in the buckled beam suspensions 84-87. Resistive heating of the thermal actuator beams by a current pulse causes the beams to elongate and reduce the buckling force below the critical buckling load. The stored elastic energy in the buckled beam suspension causes the secondary mass to move toward the neutral axis. The momentum of the secondary mass 80 carries it past the neutral axis. Cooling of the thermal actuator beams causes them to contract and restore the critical buckling load to maintain the new position of the secondary mass.

Figure 8B:
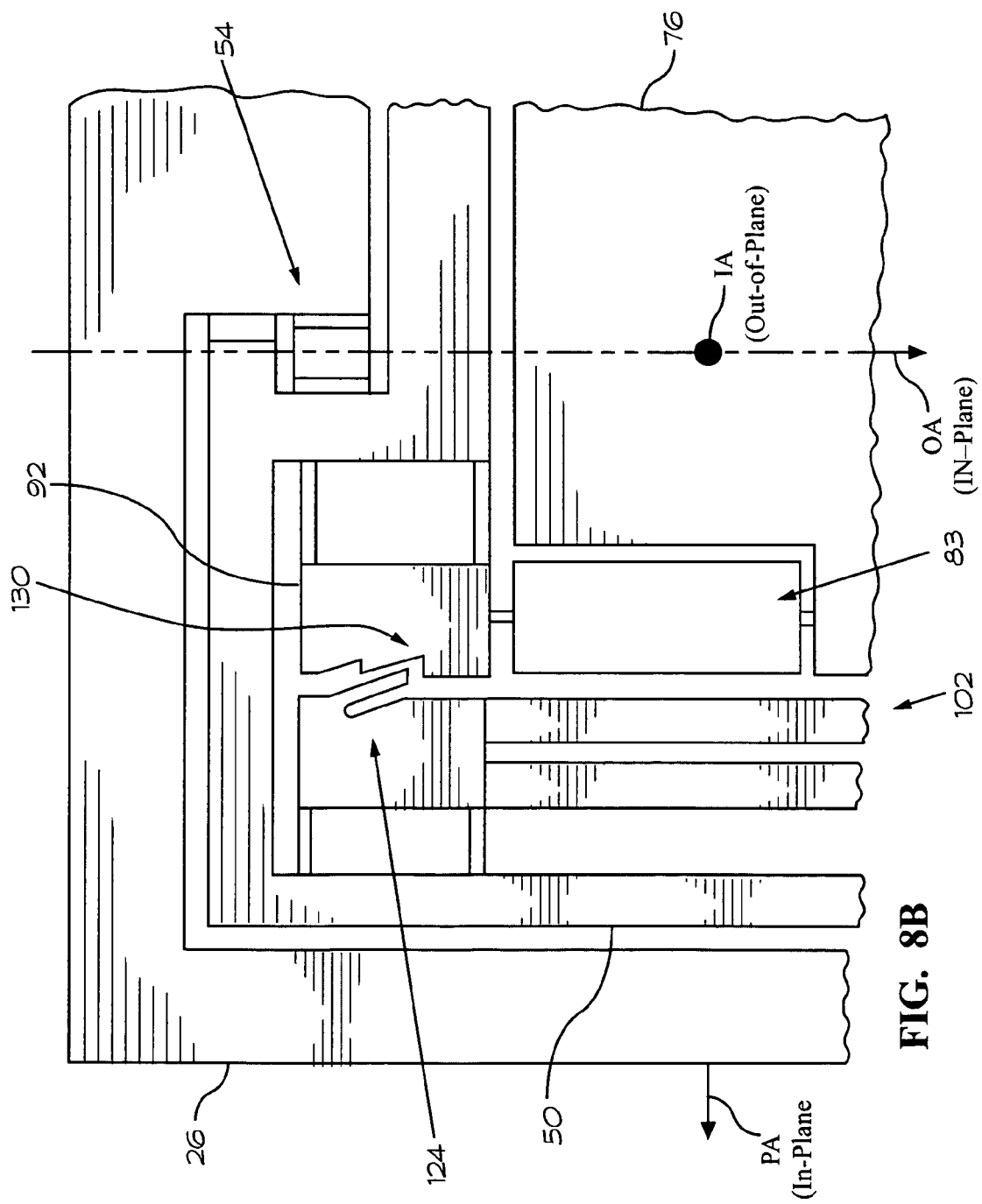
FIG. 8B illustrates a preload latching mechanism and a buckled beam suspension for that may be included in an embodiment of the present invention having an out-of-plane input axis.

FIG. 8B is similar to FIG. 8A with the difference being that the buckled beams 83-90 are arranged for sensing acceleration along an out-of-plane input axis.

Figure 9:
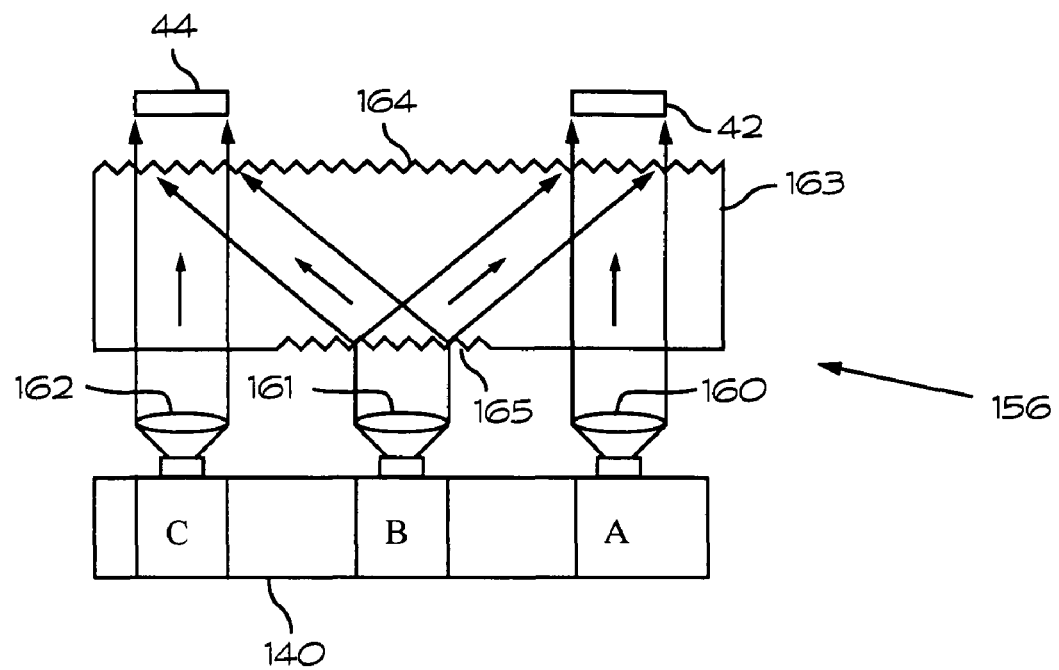
FIGS. 9 and 10 illustrate combining optics systems that may be included in the present invention.

FIG. 9 shows a combining optics assembly 156 that may be included in the present invention. The laser assembly 140 includes the lasers A-C as in FIG. 8. Lenses 160-162 collimate the light beams output from the lasers A-C, respectively, and direct the collimated light to a silica block 163 that includes gratings 164 and 165 formed on opposite sides thereof. The laser beams A and C pass through the silica block 163 and are normally incident upon the grating 164. The light beam from laser B is incident upon the grating 165, which divides laser beam B into two separate beams. A first part of laser beam B combines with laser beam A at the grating 164 to form an interference pattern that passes through the grating 164 to the photodetector 42. A second part of laser beam B combines with laser beam C at the grating 164 to form another interference pattern that passes through the grating 164 to the photodetector 44.

Figure 10:
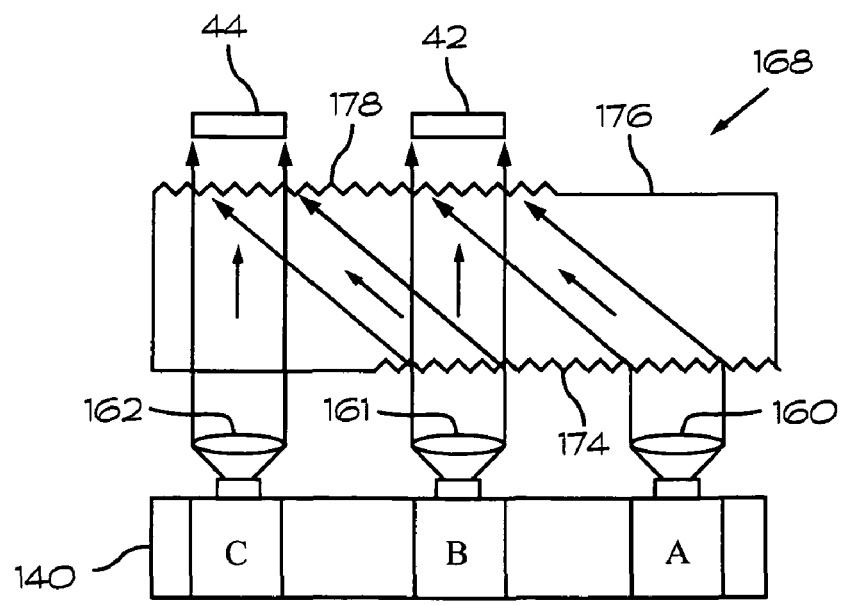

FIG. 10 shows an alternate embodiment of a combining optics assembly 168 that may be included in the present invention. The laser beams A and B are incident upon a grating 174 formed on a silica block 176 and combine at a grating 178 to form an interference pattern that is detected by the photodetector 42. The laser beam C propagates through the silica block 176 to the grating 178. The laser beam B divides at the grating 174 so that a portion of it is deflected to combine with laser beam B to form an interference pattern that is detected by the photodetector 44.

What is claimed is:

1. A self-calibrating accelerometer system that continuously removes bias errors from acceleration measurements under dynamic operating conditions, comprising:
    a frame;
    a first mass modulated accelerometer positioned within the frame, including:
        a first proof mass mounted to the sensing element frame by a first flexure suspension, the first proof mass being arranged to rotate about an output axis in response to acceleration of the sensing element frame along a first input axis, the first proof mass including a first secondary mass that is movable between a first stable position on a first side of the output axis and a second stable position on a second side of the output axis at a selected frequency to provide mass modulation of the first proof mass and to provide a selectively reversible polarity to the input axis and to provide self-calibration of bias;
    a second mass modulated accelerometer positioned within the frame, including:
        a second proof mass mounted to the sensing element frame by a second flexure suspension, the second proof mass being arranged to rotate about the output axis in response to acceleration of the sensing element frame along a second input axis, the second proof mass including a second secondary mass that is movable between a first stable position on a first side of the output axis and a second stable position on a second side of the output axis to provide mass modulation of the second proof mass and to provide a selectively reversible polarity to the input axis and to provide self-calibration of bias, the first and second mass modulated accelerometers being arranged such to have opposite polarities when the first and second secondary masses are in their respective stable positions; and
    a signal pickoff system arranged to provide a signal that indicates linear acceleration of the first and second proof masses within the sensing element frame along the input axis.

2. The self-calibrating accelerometer system of claim 1 wherein the signal pickoff system comprises:
    a first laser having a first cavity length determined by the angular position of the first proof mass within the sensing element frame;
    a second laser having a second cavity length determined by the angular position of the second proof mass within the sensing element frame;
    a third laser having a cavity length determined by the position of the sensing element frame relative to the third laser; and
    a combining optics system arranged to combine an output of the first laser with an output of the third laser to produce a first optical output signal, the combining optics system being further arranged to combine an output of the second laser with the output of the third laser to produce a second optical output signal and form an interference pattern between the first and second optical output signals.

3. The self-calibrating accelerometer system of claim 2 wherein the first and second mass modulated accelerometers are formed in a silicon-on-insulator wafer having a handle layer, a silicon dioxide layer and a device layer with the first and second proof masses and the first and second flexure suspensions being formed in the handle layer, comprising:
    a first buckled beam flexure system arranged to support the first secondary mass in the first proof mass;
    a first pair of thermal actuator beams arranged to hold the first buckled beam flexure system in compression such that the first secondary mass is in its first stable position, the first pair of thermal actuator beams being arranged to selectively remove the compression from the first buckled beam suspension causing the first secondary mass to translate to its second stable position and reverse the polarity torque on the first proof mass in response to acceleration while non-acceleration induced torques do not reverse;
    a second buckled beam flexure system arranged to support the second secondary mass in the second proof mass;
    a second pair of thermal actuator beams arranged to hold the second buckled beam flexure system in compression such that the second secondary mass is in its first stable position, the second pair of thermal actuator beams being arranged to selectively remove the compression from the second buckled beam suspension causing the second secondary mass to translate to its second stable position and reverse the polarity torque on the second proof mass in response to acceleration while non-acceleration induced torques do not reverse.

4. The self-calibrating accelerometer system of claim 3, comprising:
    a first pair of mass modulated accelerometers according to claim 3 formed in the wafer and arranged to measure acceleration along a first sensing axis in the plane of the wafer;
    a second pair of mass modulated accelerometers according to claim 3 formed in the wafer and arranged to measure accelerometer along a second sensing axis in the plane of the wafer and perpendicular to the first sensing axis; and
    a third pair of mass modulated accelerometers according to claim 3 formed in the wafer and arranged to measure acceleration along a third sensing axis perpendicular to the plane of the wafer.

5. The self-calibrating accelerometer system of claim 1 wherein the signal pickoff system comprises a plurality of capacitors arranged to produce signals that indicate rotation of the first and second proof masses about the sensing axis.

6. The self-calibrating accelerometer system of claim 5 wherein the first and second mass modulated accelerometers are formed in a silicon-on-insulator wafer having a handle layer, a silicon dioxide layer and a device layer with the first and second proof masses and the first and second flexure suspensions being formed in the handle layer, comprising:

a first buckled beam flexure system arranged to support the first secondary mass in the first proof mass;

a first pair of thermal actuator beams arranged to hold the first buckled beam flexure system in compression such that the first secondary mass is in its first stable position, the first pair of thermal actuator beams being arranged to selectively remove the compression from the first buckled beam suspension causing the first secondary mass to translate to its second stable position and reverse the polarity torque on the first proof mass in response to acceleration while non-acceleration induced torques do not reverse;

a second buckled beam flexure system arranged to support the second secondary mass in the second proof mass;

a second pair of thermal actuator beams arranged to hold the second buckled beam flexure system in compression such that the second secondary mass is in its first stable position, the second pair of thermal actuator beams being arranged to selectively remove the compression from the second buckled beam suspension causing the second secondary mass to translate to its second stable position and reverse the polarity torque on the second proof mass in response to acceleration while non-acceleration induced torques do not reverse.

7. The self-calibrating accelerometer system of claim 6, comprising:

a first pair of mass modulated accelerometers according to claim 6 formed in the wafer and arranged to measure acceleration along a first sensing axis in the plane of the wafer;

a second pair of mass modulated accelerometers according to claim 6 formed in the wafer and arranged to measure accelerometer along a second sensing axis in the plane of the wafer and perpendicular to the first sensing axis; and a third pair of mass modulated accelerometers according to claim 6 formed in the wafer and arranged to measure acceleration along a third sensing axis perpendicular to the plane of the wafer.

\* \* \* \* \*